(12) United States Patent
Lee et al.

(10) Patent No.: US 8,196,003 B2
(45) Date of Patent: Jun. 5, 2012

(54) APPARATUS AND METHOD FOR NETWORK-CODING

(75) Inventors: Sung-won Lee, Suwon-si (KR);
Young-gon Choi, Suwon-si (KR);
Jung-ho Kim, Suwon-si (KR);
Yong-sung Roh, Icheon-si (KR);
Hyun-cheol Park, Daejeon-si (KR);
Joong-soo Ma, Daejeon-si (KR);
Nam-shik Kim, Yongin-si (KR)

(73) Assignees: Samsung Electronics Co., Ltd., Suwon-si (KR); ICU Research Industrial Cooperation Group, Daejeon-si (KR)

( * ) Notice: Subject to any disclaimer, the term of this patent is extended or adjusted under 35 U.S.C. 154(b) by 1157 days.

(21) Appl. No.: 12/026,202

(22) Filed: Feb. 5, 2008

(65) Prior Publication Data

US 2009/0041097 A1    Feb. 12, 2009

(30) Foreign Application Priority Data

Aug. 7, 2007    (KR) .................. 10-2007-0079238

(51) Int. Cl.
*H03M 13/00*    (2006.01)
(52) U.S. Cl. .................. 714/755; 714/774; 714/757
(58) Field of Classification Search .................. 714/755, 714/774, 752, 748, 750, 757, 736
See application file for complete search history.

(56) References Cited

U.S. PATENT DOCUMENTS

| | | | | |
|---|---|---|---|---|
| 3,899,775 | A * | 8/1975 | Larsen | 705/21 |
| 5,430,768 | A * | 7/1995 | Minuhin et al. | 375/340 |
| 6,072,825 | A * | 6/2000 | Betts et al. | 375/222 |
| 7,236,591 | B2 * | 6/2007 | Sim | 380/33 |
| 7,269,240 | B2 * | 9/2007 | Hsu et al. | 375/376 |
| 7,787,522 | B2 * | 8/2010 | Wang et al. | 375/150 |
| 2003/0129999 | A1 | 7/2003 | Ikeda et al. | |
| 2005/0265387 | A1 | 12/2005 | Khojastepour et al. | |
| 2007/0081603 | A1 | 4/2007 | Jang et al. | |

FOREIGN PATENT DOCUMENTS

| | | |
|---|---|---|
| JP | 2001-024570 A | 1/2001 |
| JP | 2006-129396 A | 5/2006 |
| KR | 10-2006-0084761 A | 7/2006 |
| KR | 10-2006-0132148 A | 12/2006 |
| KR | 2007-0035863 A | 4/2007 |

* cited by examiner

*Primary Examiner* — Fritz Alphonse
(74) *Attorney, Agent, or Firm* — Sughrue Mion, PLLC

(57) ABSTRACT

Provided are a network-coding apparatus and method which can increase a data communication capacity in a communication environment to which an error-correction code (ECC) is applied. The network-coding apparatus includes a received signal processing unit receiving at least two signals, and decoding the at least two received signals; and a transmission signal processing unit receiving the at least two decoded signals from the received signal processing unit, merging the at least two decoded signals, and generating a merged transmission signal.

10 Claims, 6 Drawing Sheets

APPARATUS AND METHOD FOR NETWORK-CODING

CROSS REFERENCE TO RELATED APPLICATIONS

This application claims priority from Korean Patent Application No. 10-2007-0079238 filed on Aug. 7, 2007, the disclosure of which is incorporated herein in its entirety by reference.

BACKGROUND OF THE INVENTION

1. Field of the Invention

The present invention relates to an apparatus and method for network-coding, and more particularly, to an apparatus and method for network-coding that can be used in a communication environment to which an error correction code is applied.

2. Description of the Related Art

Relay networks are used to stably perform communications in shadow zones and extend cell coverage in which communication services are possible, and are aimed at improving communication performance between a base station and a terminal through cooperation with a repeater.

As relay networks become more common, repeaters need to have greater performance to facilitate stable communications between base stations and terminals. However, there are many problems that impede such performance improvement.

SUMMARY OF THE INVENTION

In order to resolve the problems, the present invention provides a network-coding apparatus and method that can increase a network transmission capacity, in a communication environment to which an error correction code (ECC) is applied.

According to an aspect of the present invention, there is provided a network-coding apparatus including: a received signal processing unit receiving at least two signals and decoding the at least two received signals; and a transmission signal processing unit receiving the at least two decoded signals from the received signal processing unit, merging the at least two decoded signals, and generating a merged transmission signal.

According to another aspect of the present invention, there is provided a network-coding method including: receiving at least two signals and decoding the at least two signals; and merging the at least two decoded signals, and generating a merged transmission signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Figure 1:
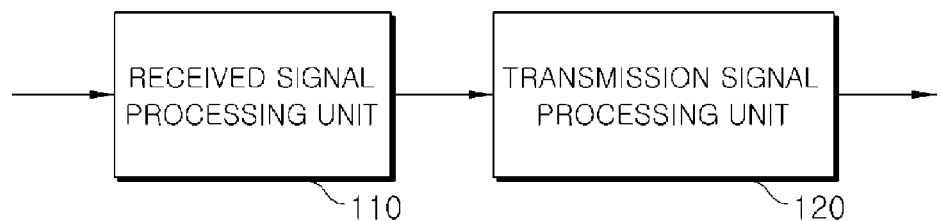
FIG. 1 is a block diagram of a network-coding apparatus according to an embodiment of the present invention.

FIG. 1 is a block diagram of a network-coding apparatus according to an embodiment of the present invention. Referring to FIG. 1, the network-coding apparatus includes a received signal processing unit 110 and a transmission signal processing unit 120.

The received signal processing unit 110 receives at least two received signals $c_1$ and $c_2$ from a terminal (not shown) or a repeater (not shown), decodes the signals $c_1$ and $c_2$, and outputs the decoded signals to the transmission signal processing unit 120. Here, each received signal $c_1$ or $c_2$ may be a signal which is encoded by a Recursive Systematic Convolutional (RSC) encoder installed in a user's device, or may be a signal obtained by encoding information $m_1$ and $m_2$ which is stored in a repeater including the received signal processing unit 110. However, the present invention is not limited to this.

Also, the transmission signal processing unit 120 receives the at least two decoded signals from the received signal processing unit 110, merges the at least two decoded signals, and thus generates a merged transmission signal. Thereafter, the merged transmission signal can be transmitted to a repeater (not shown).

Figure 2:
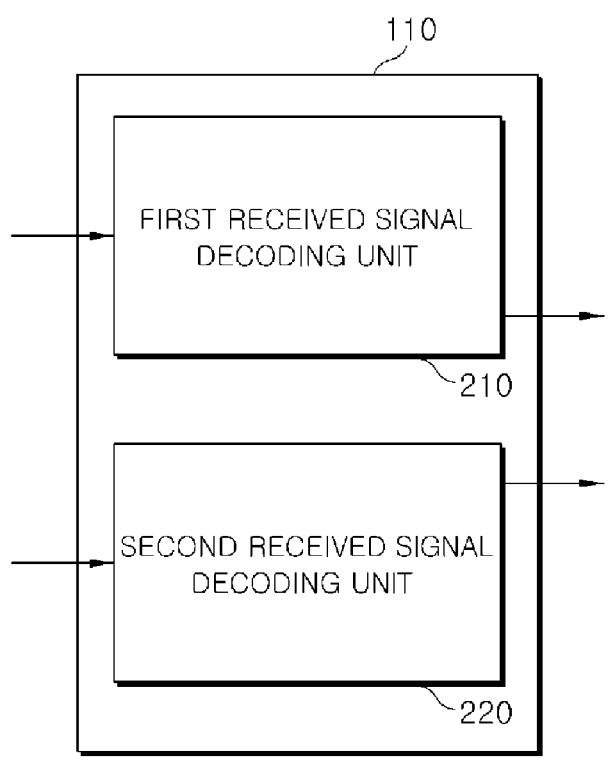
FIG. 2 is a block diagram of a received signal processing unit according to an embodiment of the present invention, which is included in the network-coding apparatus illustrated in FIG. 1.

FIG. 2 is a block diagram of the received signal processing unit 110 according to an embodiment of the present invention, which is included in the network-coding apparatus illustrated in FIG. 1. In the current embodiment, a case where two received signals are used is described as an example, however, the present invention is not limited to this, and two or more received signals can be used.

The received signal processing unit 110 includes a first received signal decoding unit 210 and a second received signal decoding unit 220. The first received signal decoding unit 210 and the second received signal decoding unit 220 perform error-correction decoding on signals that are received from a terminal (not shown) or a repeater (not shown), and output the results of the error-correction decoding to the transmission signal processing unit 120. Here, error correction decoding method for performing the error-correction decoding on the received signals includes a Soft-Output Viterbi Algorithm (hereinafter, referred to as 'SOVA') method and a Maximum A Poseriori (hereinafter, referred to as 'MAP') method. The first and second received signal decoding units 210 and 220 restore original information by iteratively decoding the received signals using one of the error-correction decoding methods. The SOVA method is used as an extended algorithm for a soft-output in a viterbi decoder. However, the SOVA method has poor bit-error rate (BER) performance compared to the MAP method. Each decoder component can decode input signals using one of a variety of decoding methods that include the MAP method and the SOVA method. If the SOVA method is used, a predetermined number of bits are additionally needed since a decoder's dynamic range, which increases by branch metric calculation, has to be considered. Likewise, when the MAP method is used, since internal branch metric calculation depends on a code rate, a predetermined number of bits are additionally needed. The MAP method has a coding gain which, compared to the SOVA method, is higher by 0.3 dB in an Additive White Gaussian Noise (AWGN) environment having a good channel environment, and by 3 dB in a Rayleigh Feding environment having a poor channel environment.

Figure 3:
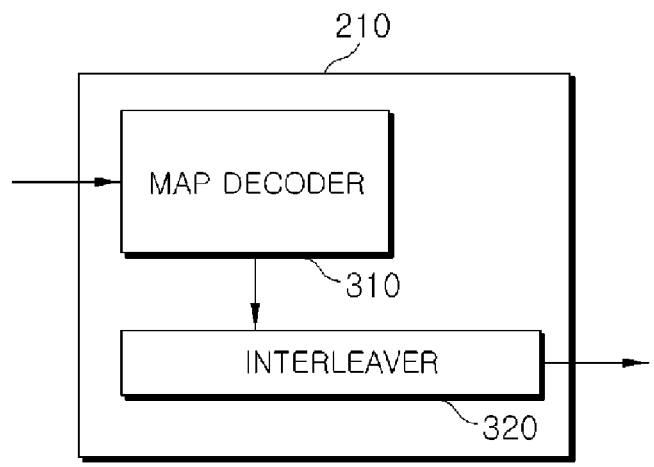
FIG. 3 is a block diagram of a first received signal decoding unit according to an embodiment of the present invention, which is included in the received signal processing unit of the network-coding apparatus.

FIG. 3 is a block diagram of the first received signal decoding unit 210 according to an embodiment of the present invention, which is included in the received signal processing unit 110 of the network-coding apparatus. In order to simplify the description the second received signal decoding unit 220 is not shown or described. The second received signal decoding unit 220 has a configuration similar to that of the first received signal decoding unit 210, and operates similarly to that of the second received signal decoding unit 210.

Referring to FIG. 3, the first received signal decoding unit 210 includes a MAP decoder 310 and an interleaver 320. The MAP decoder 310 performs MAP decoding on a signal $c_1$ which is received from a terminal (not shown) or a repeater (not shown), predicts a real information value of the signal $c_1$, and outputs a predicted signal $\tilde{M}_{\bar{I}}$ to the interleaver 320.

Here, the MAP decoder 310 can further include a soft input/soft output (SISO) decoder based on a MAP algorithm, however, the present invention is not limited to this. Also, the interleaver 320 receives the signal $\tilde{M}_{\bar{I}}$ subjected to MAP decoding from the MAP decoder 310, performs interleaving on the signal $\tilde{M}_{\bar{I}}$ to generate a decoded signal $\tilde{m}_1$, and outputs the decoded signal $\tilde{m}_1$ to the transmission signal processing unit 120.

Figure 4:
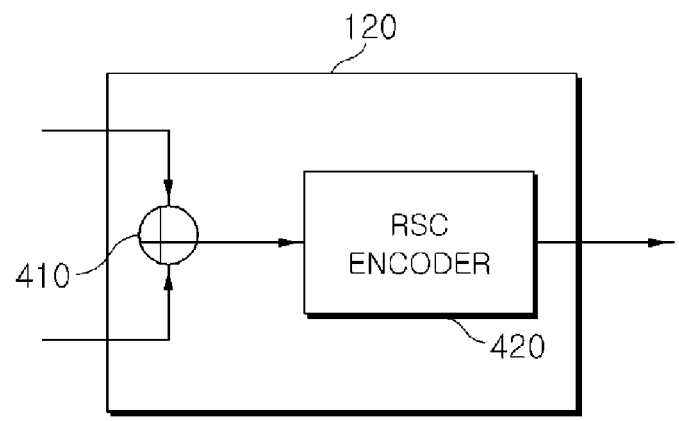
FIG. 4 is a block diagram of a transmission signal processing unit according to an embodiment of the present invention, which is included in the network-coding apparatus illustrated in FIG. 1.

FIG. 4 is a block diagram of the transmission signal processing unit 120 according to an embodiment of the present invention, which is included in the network-coding apparatus illustrated in FIG. 1. In the current embodiment, a case where two received signals are used is illustrated, however, the present invention is not limited to this, and two or more received signals can be processed.

Referring to FIG. 4, the transmission signal processing unit 120 includes a merging unit 410 and an RSC encoder 420. The merging unit 410 receives the decoded signals $\tilde{m}_1$ and $\tilde{m}_2$ from interleavers of the received signal processing unit 110, merges the decoded signals $\tilde{m}_1$ and $\tilde{m}_2$ to generate a merged signal $\tilde{m}$ and outputs the merged signal $\tilde{m}$ to the RSC encoder 420. The merging operation may be an XOR operation according to Equation 1, however, the present invention is not limited to this.

$$\tilde{m} = \tilde{m}_1 \oplus \tilde{m}_2 = [\tilde{m}_{1,1} \oplus \tilde{m}_{2,1}, \Lambda, \tilde{m}_{1,N} \oplus \tilde{m}_{2,N}], \quad (1)$$

where each signal has a vector format, and thus, suffixes of 1 through N are used to represent that each signal is a component of a vector.

Also, the RSC encoder 420 receives the merged signal $\tilde{m}$ from the merging unit 410, encodes the merged signal $\tilde{m}$ and generates a merged transmission signal $\tilde{c}$. Here, the merged transmission signal $\tilde{c}$ is modulated and then transmitted according to a broadcasting method to a user's terminal and a base station, however, the present invention is not limited to this. Also, a function RSC_ENC of encoding the merged signal $\tilde{m}$ to the merged transmission signal $\tilde{c}$ can be expressed as Equation 2.

$$\tilde{c} = RSC\_ENC(\tilde{m}), \quad (2)$$

Figure 5:
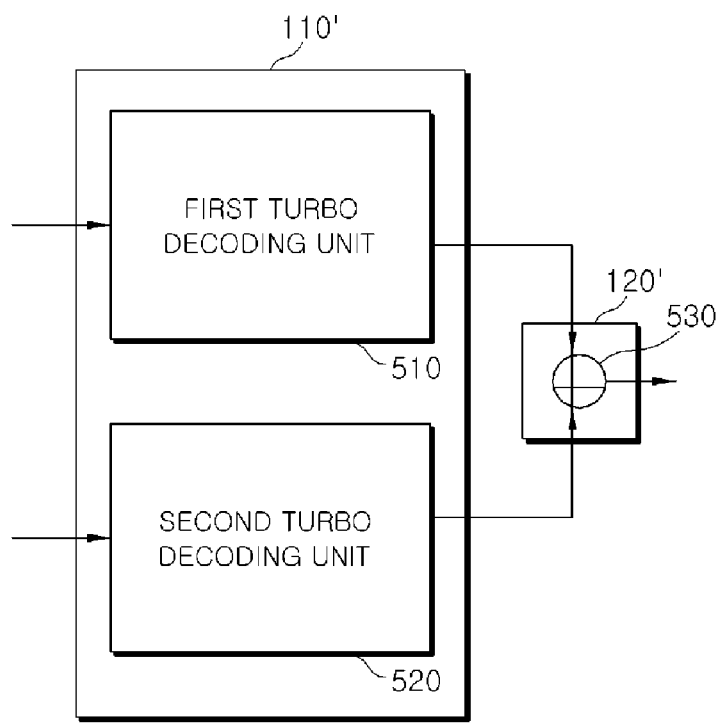
FIG. 5 is a block diagram of a network-coding apparatus according to another embodiment of the present invention.

FIG. 5 is a block diagram of a network-coding apparatus according to another embodiment of the present invention. The network-coding apparatus includes a first turbo decoding unit 510, a second turbo decoding unit 520, and a turbo signal merging unit 530.

The first turbo decoding unit 510 turbo-decodes a signal which is received from a terminal (not shown) or a repeater (not shown), and outputs the turbo-decoded signal $\tilde{p}_{\bar{I}}$ to the turbo signal merging unit 530.

The turbo decoding unit outputs a puncturing pattern $\tilde{p}_{\bar{I}}$ for restoring a parity bit of a turbo code which has not been transmitted from a different terminal (not shown) or a different repeater (not shown), through decoding of a turbo code which is a received signal, and transmitting the restored parity bit to the terminal or the repeater. The puncturing pattern $\tilde{p}_{\bar{I}}$ is used to extract only a parity bit of a turbo code which has not been transmitted from a transmitting station, from among restored turbo codes. That is, the first turbo decoding unit 510 restores a received turbo code to a turbo code with a complete format consisting of an information bit, a first parity bit, and a second parity bit, and can selectively transmit a parity bit which has not been transmitted from a different terminal (not shown) or a different repeater (not shown), to the terminal or the repeater, through puncturing.

Also, the second turbo decoding unit 520 turbo-decodes the other signal which is received from a terminal (not shown) or a repeater (not shown), and outputs the turbo-decoded signal $\tilde{p}_2$ to the turbo signal merging unit 530.

Here, the turbo-decoding unit outputs a puncturing pattern $\tilde{p}_2$ for restoring a parity bit of a turbo code which has not been transmitted from a different terminal (not shown) or a different repeater (not shown), through decoding of a turbo code which is a received signal, and transmitting the restored parity bit to the terminal or the repeater. The puncturing pattern $\tilde{p}_2$ is used to extract only a parity bit of a turbo code which has not been transmitted from a transmitting station, from among restored turbo codes. That is, the second turbo decoding unit 520 restores a received turbo code to a turbo code with a complete format consisting of an information bit, a first parity bit, and a second parity bit, and can selectively transmit a parity bit which has not been transmitted from a different terminal (not shown) or a different repeater (not shown), to the terminal or the repeater, through puncturing.

Meanwhile, the turbo merging unit 530 receives the turbo-decoded signals $\tilde{p}_{\bar{1}}$ and $\tilde{p}_{\bar{2}}$ from the first turbo decoding unit 510 and the second turbo decoding unit 520, merges the turbo-decoded signals $\tilde{p}_{\bar{1}}$ and $\tilde{p}_{\bar{2}}$, and generates a merged transmission signal $\tilde{p}$. Also, the merged transmission signal $\tilde{p}$ can be modulated and then transmitted according to a broadcasting method to a user's terminal and a base station, however, the present invention is not limited to this.

Figure 6:
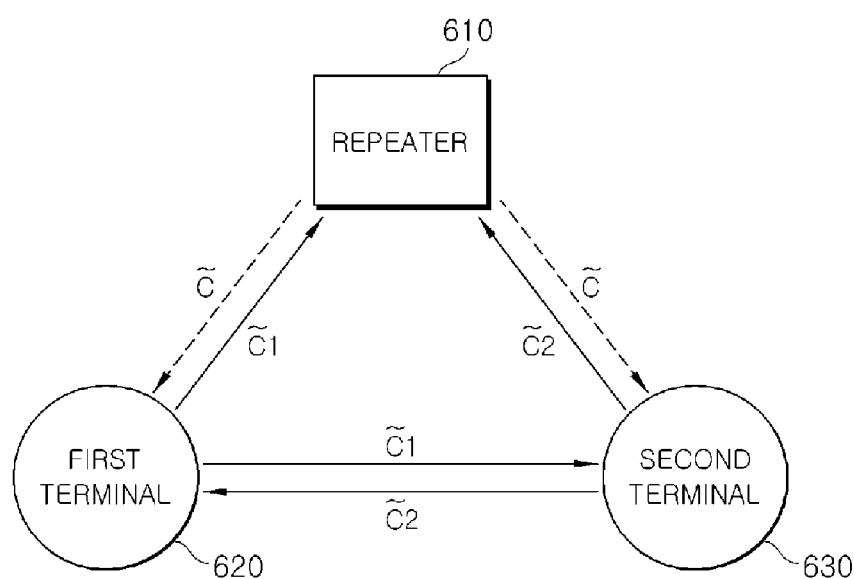
FIG. 6 is an exemplary view for explaining communications between a repeater and terminals, according to an embodiment of the present invention.

FIG. 6 is an exemplary view for explaining communications between a repeater and terminals, according to an embodiment of the present invention. The operation of the present invention will be described with reference to FIGS. 1 through 6, below.

Referring to FIG. 6, first, a repeater 610 receives signals $\tilde{c}_{\bar{1}}$ and $\tilde{c}_{\bar{2}}$ from a first terminal 620 and a second terminal 630, respectively. Thereafter, the received signal processing unit 110, which is installed in the repeater 610, decodes and interleaves the received signals $\tilde{c}_{\bar{1}}$ and $\tilde{c}_{\bar{2}}$, and generates the decoded signals $\overline{m}_1$ and $\overline{m}_2$. Thereafter, the transmission signal processor 120, which is installed in the repeater 610, merges and encodes the decoded signals $\overline{m}_1$ and $\overline{m}_2$, and generates a merged transmission signal $\tilde{c}$. Then, the repeater 610 broadcasts the merged transmission signal $\tilde{c}$ to the first terminal 620 and the second terminal 630.

Thereafter, the first terminal 620 can acquire an encoded signal $c_2$ which the second terminal 630 tries to transmit, using an encoded signal $c_1$ of information included in the first terminal 620 and the merged transmission signal $\tilde{c}$ received from the repeater 610. Here, the encoded signals $c_1$ and $c_2$ represent RSC encoding values for original information $m_1$ and $m_2$, and the signals $\tilde{c}_{\bar{1}}$ and $\tilde{c}_{\bar{2}}$ that are obtained by encoding the received signals $\overline{m}_1$ and $\overline{m}_2$ generated by predicting and interleaving reflect the values $c_1$ and $c_2$.

Here, the first terminal 620 obtains the encoded signal $c_2$ which the second terminal 630 tries to transmit, using a Log Likelihood Ratio (LLR) value. This operation will be described below.

First, a LLR value $L(\tilde{c})$ for the merged transmission signal $\tilde{c}$ is calculated. The merged transmission signal $\tilde{c}$ has a vector format, and thus, a LLR value $L(\tilde{c})$ of the merged transmission signal $\tilde{c}$ can be expressed as $L(\tilde{c}_{\bar{1}}), \ldots, L(\tilde{c}_{\bar{M}})$, wherein M represents the number of components of the merged transmission signal $\tilde{c}$. Here, Equation 3 can be obtained by linearity of codes, as follows.

$$\tilde{c} = RSC\_ENC(\overline{m}) = RSC\_ENC(\overline{m}_1 \oplus \overline{m}_2) = RSC\_ENC(\overline{m}_1) \oplus RSC\_ENC(\overline{m}_2) = \tilde{c}_{\bar{1}} \oplus \tilde{c}_{\bar{2}} \quad (3)$$

Thereafter, the first terminal 620 can calculate a LLR value $L(c_2)$ for the signal $c_2$, to which information of the signal $c_2$ which the repeater 610 has transmitted is reflected, using the code $c_1$ for the original information ml which the first terminal 620 tries to transmit, according to Equation 4.

$$L(c_2) = (-2c_1 + 1) \cdot L(\tilde{c}) \quad (4)$$

Also, if the repeater 610, the first terminal 620, and the second terminal 630 uses a turbo-encoding method, the following operation is performed.

First, the first terminal 620 and the second terminal 630 encode original information $m_1$ and $m_2$ that are to be transmitted, using the turbo-encoding method, and transmit the encoded information to the repeater 610. Thereafter, the repeater 610 obtains decoded signals $\tilde{p}_{\bar{1}}$ and $\tilde{p}_{\bar{2}}$ on the basis of the encoded information that are received through the first turbo decoding unit 510 and the second turbo decoding unit 520, and then obtains a merged transmission signal $\tilde{p}$ through an XOR operation according to Equation 5.

$$\tilde{p} := \tilde{p}_{\bar{1}} \oplus \tilde{p}_{\bar{2}} = [\tilde{p}_{\bar{1}:\bar{1}} \oplus \tilde{p}_{\bar{2}:\bar{1}}, \tilde{p}_{\bar{1}:\bar{2}} \oplus \tilde{p}_{\bar{2}:\bar{2}}, \ldots, \tilde{p}_{\bar{1}:\bar{Q}} \oplus \tilde{p}_{\bar{2}:\bar{Q}}], \quad (5)$$

where each signal has a vector format, and thus, suffixes of 1 through Q are used to represent that each signal is a component of a vector.

Thereafter, the first terminal 620 can acquire an encoded signal $p_2$ which the second terminal 630 tries to transmit, using an encoded signal $p_1$ for information included in the first terminal 620 and the merged transmission signal $\tilde{p}$ which is received from the repeater 610. Here, the encoded signals $p_1$ and $p_2$ represent punctured turbo encoding values for original transmission information $m_1$ and $m_2$.

Here, the first terminal 620 obtains an encoded signal $p_2$ which the second terminal 630 tries to transmit, using a LLR value. This operation will be described below.

First, a LLR value $L(\tilde{p})$ for the merged transmission signal $\tilde{p}$ is calculated. Since the merged transmission signal $\tilde{p}$ has a vector format, the LLR value $L(\tilde{p})$ of the merged transmission signal $\tilde{p}$ can be expressed as $L(\tilde{p}_{\bar{1}}, \ldots, \tilde{p}_{\bar{Q}})$ wherein Q represents the number of components of the merged transmission signal $\tilde{p}$.

Thereafter, the first terminal 620 can calculate a LLR value $L(P_2)$ for the value $p_2$, to which information of a signal which the repeater 610 has transmitted is reflected, using the code $p_1$ for the original information $m_1$ which the first terminal 620 tries to transmit, according to Equation 6.

$$L(p_2) = (-2p_1 + 1) \cdot L(\tilde{p}) \quad (6)$$

Figure 7:
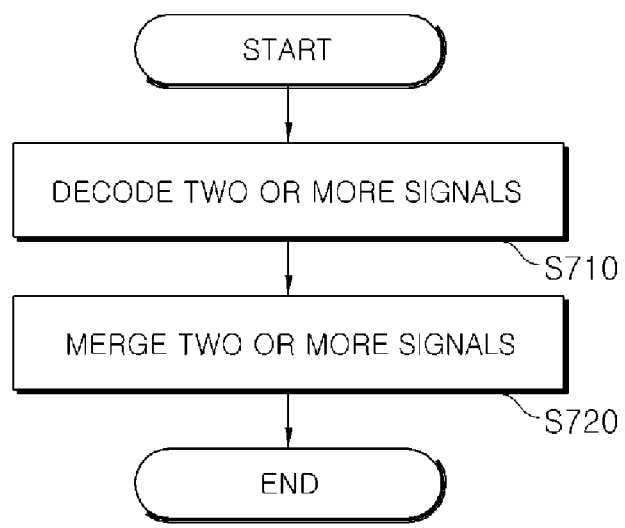
FIG. 7 is a flowchart of a network-coding method according to an embodiment of the present invention.

FIG. 7 is a flowchart of a network-coding method according to an embodiment of the present invention. Hereinafter, the network-coding method will be described with reference to FIGS. 1 through 7.

The received signal processing unit 110, which is installed in the repeater 610, the first terminal 620, or the second terminal 630, encodes at least two received signals $c_1$ and $c_2$ (operation S710), and decodes at least two received signals $c_1$ and $c_2$ that are received from an external device, except for the corresponding device including the received signal processing unit 110, among the repeater 610, the first terminal 620, and the second terminal 630 (operation S710). Here, the received signals $c_1$ and $c_2$ may be signals that are encoded by a RSC encoder which is installed in the external device, or may be signals that are not received from the outside but are obtained by encoding original information $m_1$ and $m_2$ included in the corresponding device in which the received signal processing unit 110 is installed. However, the present invention is not limited to these signals. The first received signal decoding unit 210 or the second received signal decoding unit 220, which are installed in the received signal processing unit 110, perform error-correction decoding on a signal which is received from the repeater 610, the first terminal 620, or the second terminal 630, and outputs the decoded signal to the transmission signal processing unit 120.

Also, the transmission signal processing unit 120, which is installed in the repeater 610, the first terminal 620, or the second terminal 630, receives at least two decoded signals from the received signal processing unit 110, merges the at least two decoded signals, and generates a merged transmission signal. Thereafter, the merged transmission signal can be transmitted to the remaining devices, except for the corresponding device which has generated the merged transmission signal, among the repeater 610, the first terminal 620, and the second terminal 630.

Figure 8:
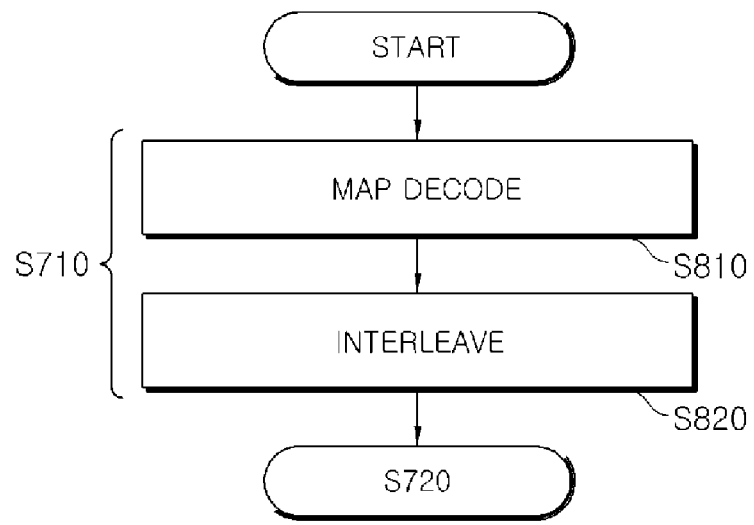
FIG. 8 is a flowchart of operation S710 of decoding received signals in the network-coding method, according to an embodiment of the present invention.

FIG. 8 is a flowchart of operation S710 of decoding received signals in the network-coding method, according to an embodiment of the present invention. The operation S710 will be described below with reference to FIGS. 1, 3 and 8.

First, the MAP decoder 310, which is installed in the first received signal decoding unit 210, predicts real information values of signals c1 and c2 that are received from a terminal (not shown) or a repeater (not shown), through MAP decoding of the signals c1 and c2, and outputs the predicted signals $\tilde{M}_{\bar{1}}$ and $\tilde{M}_{\bar{2}}$ to the interleaver 320 (operation 810).

Thereafter, the interleaver 320, which is installed in the first received signal decoding unit 210, receives the decoded signals $\tilde{M}_{\bar{1}}$ and $\tilde{M}_{\bar{2}}$ subjected to MAP decoding from the MAP decoder 310, interleaves the decoded signals $\tilde{M}_{\bar{1}}$ and $\tilde{M}_{\bar{2}}$, generates decoded signals $\tilde{M}_{\bar{1}}$ and $\tilde{M}_{\bar{2}}$, and outputs the decoded signals $\tilde{M}_{\bar{1}}$ and $\tilde{M}_{\bar{2}}$ to the transmission signal processing unit 120 (operation S820).

Figure 9:
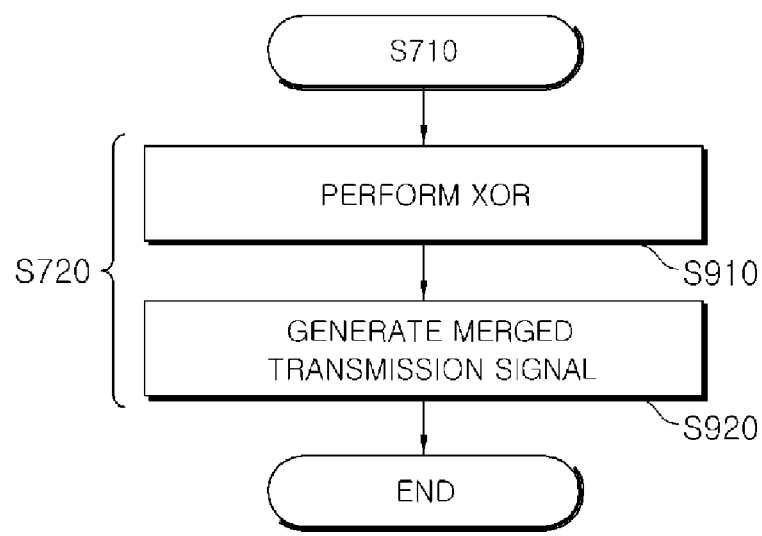
FIG. 9 is a flowchart of operation S720 of merging decoded signals in the network-coding method, according to an embodiment of the present invention.

FIG. 9 is a flowchart of operation S720 of merging the decoded signals $\tilde{M}_{\bar{1}}$ and $\tilde{M}_{\bar{2}}$ in the network-coding method, according to an embodiment of the present invention. The operation S720 will be described with reference to FIGS. 1, 4, and 9, below.

The merging unit 410, which is installed in the transmission signal processing unit 120, receives at least two decoded signals $\tilde{M}_{\bar{1}}$ and $\tilde{M}_{\bar{2}}$ from interleavers that are installed in the received signal processing unit 110, merges the decoded signals $\tilde{M}_{\bar{1}}$ and $\tilde{M}_{\bar{2}}$, generates a merged signal $\tilde{m}$ and outputs the merged signal $\tilde{m}$ to the RSC encoder 420 (operation S910). Here, the merging operation may be an XOR operation according to Equation 7, however, the present invention is not limited to this.

$$\tilde{m} = \tilde{m}_1 \oplus \tilde{m}_2 = [\tilde{m}_1 \oplus \tilde{m}_A, \tilde{m}_1 \oplus \tilde{m}_N] \quad (7)$$

where each signal has a vector format, and thus suffixes of 1 through N are used to represent that each signal is a component of a vector.

Also, the RSC encoder 420, which is installed in the transmission signal processing unit 120, receives the merged signal $\tilde{m}$ from the merging unit 410, encodes the merged signal $\tilde{m}$ and generates a merged transmission signal $\tilde{c}$ (operation S920). Here, the merged transmission signal $\tilde{c}$ can be modulated and then transmitted according to a broadcast method to a user's terminal and a base station. However, the present invention is not limited to this. Also, a function RSC_ENC of encoding the merged signal $\tilde{m}$ to a merged transmission signal $\tilde{c}$ can be expressed as Equation 8, for convenience of description.

$$\tilde{c} = RSC\_ENC(\tilde{m}) \quad (8)$$

Figure 10:
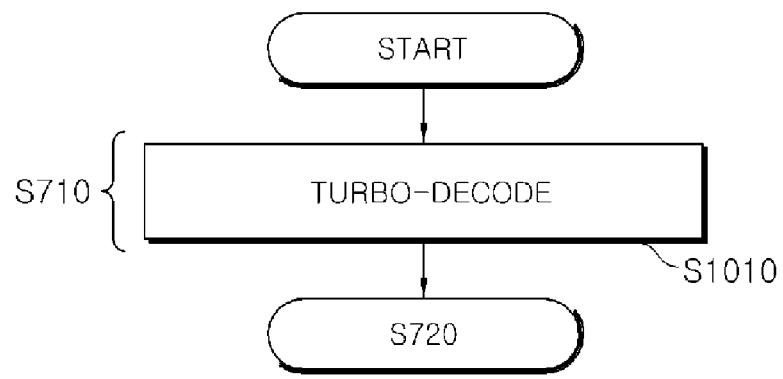
FIG. 10 is a flowchart of operation S710 of decoding received signals in the network-coding method, according to another embodiment of the present invention.

FIG. 10 is a flowchart of operation S710 of decoding the received signals $c_1$ and $c_2$ in the network-coding method, according to another embodiment of the present invention. The operation S710 will be described with reference to FIGS. 1, 5, and 10, below.

First, the first turbo decoding unit 510 turbo-decodes a signal which is received from a terminal (not shown) or a repeater (not shown), and outputs the turbo-decoded signal $\tilde{p}_{\bar{1}}$ to the turbo signal merging unit 530, and the second turbo decoding unit 520 turbo-decodes the other signal which is received from the terminal or the repeater, and outputs the turbo-decoded signal $\tilde{p}_{\bar{2}}$ to the turbo signal merging unit 530 (operation S1010).

Figure 11:
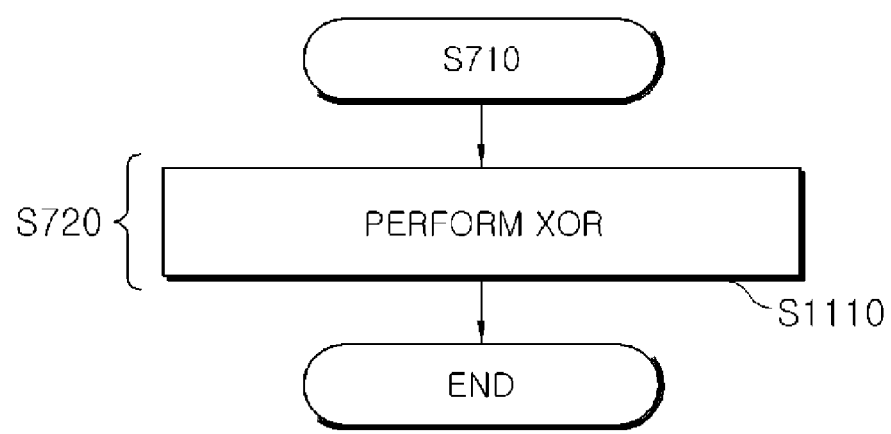
FIG. 11 is a flowchart of operation S720 of merging decoded signals in the network-coding method, according to another embodiment of the present invention.

FIG. 11 is a flowchart of operation S720 of merging the decoded signals $\tilde{p}_{\bar{1}}$ and $\tilde{p}_{\bar{2}}$ in the network-coding method, according to another embodiment of the present invention. The operation S720 will be described with reference to FIGS. 1, 5, and 11, below.

The turbo signal merging unit 530 receives the decoded signals $\tilde{p}_{\bar{1}}$ and $\tilde{p}_{\bar{2}}$ from the first turbo decoding unit 510 and the second turbo decoding unit 520, merges the decoded signals $\tilde{p}_{\bar{1}}$ and $\tilde{p}_{\bar{2}}$, and generates a merged transmission signal $\tilde{p}$ (operation S1110).

According to the network-coding apparatus and method, it is possible to increase a data transmission capacity by merging received signals together through a simple calculation and transmitting the merged signal, in a communication environment to which an ECC is applied.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A network-coding apparatus comprising:
   a received signal processing unit receiving at least two signals from two different terminals, and decoding the at least two received signals; and
   a transmission signal processing unit receiving the at least two decoded signals from the received signal processing unit, merging the at least two decoded signals, and generating a merged transmission signal,
   wherein the received signal processing unit comprises a received signal decoding unit performing error-correction decoding on a received signal among the at least two received signals, generating the decoded signal, and outputting the decoded signal to the transmission signal processing unit.

2. The network-coding apparatus of claim 1, wherein the received signal decoding unit comprises:
   a Maximum A Posteriori (MAP) decoder processing the at least two received signals by performing MAP-decoding on the at least two received signals; and
   an interleaver receiving the processed signals from the MAP decoder, interleaving the processed signals, generating the at least two decoded signals, and outputting the at least two decoded signals to the transmission signal processing unit.

3. A network-coding apparatus comprising:
   a received signal processing unit receiving at least two signals, and decoding the at least two received signals; and
   a transmission signal processing unit receiving the at least two decoded signals from the received signal processing unit, merging the at least two decoded signals, and generating a merged transmission signal,
   wherein the received signal processing unit comprises a received signal decoding unit performing error-correction decoding on a received signal among the at least two received signals, generating the decoded signal, and outputting the decoded signal to the transmission signal processing unit, wherein the received signal decoding unit comprises:
   a Maximum A Posteriori (MAP) decoder processing the at least two received signals by performing MAP-decoding on the at least two received signals; and
   an interleaver receiving the processed signals from the MAP decoder, interleaving the processed signals, generating the at least two decoded signals, and outputting the at least two decoded signals to the transmission signal processing unit,
   wherein the transmission signal processing unit comprises:
   a merging unit receiving the decoded signals from the interleaver, performing an XOR operation on the decoded signals, and generating a merged signal; and a Recursive Systematic Convolutional (RSC) encoder receiving the merged signal from the merging unit, encoding the merged signal, and generating the merged transmission signal.

4. A network-coding apparatus comprising:
a received signal processing unit receiving at least two signals, and decoding the at least two received signals; and
a transmission signal processing unit receiving the at least two decoded signals from the received signal processing unit, merging the at least two decoded signals, and generating a merged transmission signal,
wherein the received signal processing unit comprises:
a first turbo decoding unit performing turbo-decoding on a received signal of the at least two received signals, generating a first decoded signal of the at least two decoded signals, and outputting the first decoded signal to the transmission signal processing unit; and
a second turbo decoding unit performing turbo-decoding on the other received signal of the at least two received signals, generating a second decoded signal of the at least two decoded signals, and outputting the second decoded signal to the transmission signal processing unit.

5. The network-coding apparatus of claim 4, wherein the transmission signal processing unit comprises a turbo signal merging unit receiving the first decoded signal and the second decoded signal from the first turbo decoding unit and the second turbo decoding unit, respectively, performing an XOR operation on the first decoded signal and the second decoded signal, and generating the merged transmission signal.

6. A network-coding method comprising:
receiving, from two different terminals, at least two signals, and decoding the at least two received signals; and
merging, using a processor, the at least two decoded signals, and generating a merged transmission signal,
wherein the decoding of the at least two signals comprises performing error-correction decoding on a received signal of the at least two received signals, and generating one of the at least two decoded signals.

7. The network-coding method of claim 6, wherein the decoding of the at least two received signals comprises:
processing the at least two received signals by performing Maximum A Posteriori (MAP) decoding on the at least two received signals; and
interleaving the processed signals, and generating the at least two decoded signals.

8. A network-coding method comprising:
receiving at least two signals, and decoding the at least two received signals; and
merging, using a processor, the at least two decoded signals, and generating a merged transmission signal,
wherein the decoding of the at least two received signals comprises:
processing the at least two received signals by performing Maximum A Posteriori (MAP) decoding on the at least two received signals; and
interleaving the processed signals, and generating the at least two decoded signals,
wherein the merging the at least two decoded signals comprises:
performing an XOR operation on the at least two decoded signals, and generating a merged signal; and
encoding the merged signal by a Recursive Systematic Convolutional (RSC) encoder, and generating the merged transmission signal.

9. A network-coding method comprising:
receiving at least two signals, and decoding the at least two received signals; and
merging, using a processor, the at least two decoded signals, and generating a merged transmission signal,
wherein the decoding of the at least two received signals comprises:
performing turbo-decoding on a received signal of the at least two received signals, generating a first decoded signal of the at least two decoded signals, performing turbo-decoding on the other received signal of the at least two received signals, and generating a second decoded signal of the at least two decoded signals.

10. The network-coding method of claim 9, wherein the generating of the merged transmission signal comprises performing an XOR operation on the first decoded signal and the second decoded signal, and generating the merged transmission signal.

* * * * *